United States Patent [19]

Beck

[11] Patent Number: 5,634,986
[45] Date of Patent: Jun. 3, 1997

[54] PROCESS FOR REDUCING METAL EXPOSURES OF SICCATIVE ORGANIC COATINGS

[75] Inventor: Leslie M. Beck, Concord, Ohio

[73] Assignee: Man-Gill Chemical Company, Cleveland, Ohio

[21] Appl. No.: 332,699

[22] Filed: Nov. 1, 1994

[51] Int. Cl.$^6$ ..................... C10M 173/02; C10M 133/04
[52] U.S. Cl. .......................................... 148/246; 508/312
[58] Field of Search ........................ 148/246; 252/49.3, 252/34, 25, 547

[56] References Cited

U.S. PATENT DOCUMENTS

| | | | |
|---|---|---|---|
| 3,060,163 | 10/1962 | Erchak | 260/94.9 |
| 3,850,658 | 11/1974 | Gomez et al. | 117/7 |
| 3,912,548 | 10/1975 | Faigen | 148/6.15 R |
| 4,017,334 | 4/1977 | Matsushima et al. | 148/6.15 R |
| 4,054,466 | 10/1977 | King et al. | 148/6.27 |
| 4,063,969 | 12/1977 | Howell | 148/6.27 |
| 4,111,722 | 9/1978 | Reghi et al. | 148/6.15 R |
| 4,148,670 | 4/1979 | Kelly | 148/6.15 R |
| 4,165,242 | 8/1979 | Kelly et al. | 148/6.15 Z |
| 4,273,592 | 6/1981 | Kelly | 148/6.27 |
| 4,313,769 | 2/1982 | Frelin et al. | 148/6.27 |
| 4,338,140 | 7/1982 | Reghi | 148/6.14 R |
| 4,370,177 | 1/1983 | Frelin et al. | 148/6.27 |
| 4,371,658 | 2/1983 | Marshall et al. | 524/585 |
| 4,391,652 | 7/1983 | Das et al. | 148/6.15 R |
| 4,728,478 | 3/1988 | Sacks et al. | 264/514 |
| 4,803,097 | 2/1989 | Fraenkel et al. | 427/307 |
| 4,873,144 | 10/1989 | Marshall | 428/395 |
| 4,886,707 | 12/1989 | Marshall | 428/395 |
| 5,030,323 | 7/1991 | Awad | 156/665 |
| 5,061,389 | 10/1991 | Reichgott | 252/56 R |
| 5,080,814 | 1/1992 | Awad | 252/49.3 |
| 5,110,494 | 5/1992 | Beck | 252/156 |
| 5,135,804 | 8/1992 | Harpell et al. | 428/296 |
| 5,196,481 | 3/1993 | Owens et al. | 525/108 |
| 5,238,731 | 8/1993 | Blanch et al. | 428/266 |
| 5,279,677 | 1/1994 | Das | 134/3 |
| 5,286,300 | 2/1994 | Hnatin et al. | 134/2 |
| 5,476,601 | 12/1995 | Bershas | 148/246 |

*Primary Examiner*—Sam Silverberg
*Attorney, Agent, or Firm*—Renner, Otto, Boisselle & Sklar

[57] ABSTRACT

A process is described for reducing the metal exposure rating of metal surfaces which subsequently are coated with a siccative coating which comprises contacting said metal surface with an aqueous composition comprising a polyethylene selected from the group consisting of ethylene homopolymers, oxidized ethylene homopolymers, ethylene/acrylate copolymers, and terpolymers containing ethylene, acrylates, and esters. A process is also described for improving the mobility of formed metal surfaces and reducing the metal exposure rating of the surfaces which subsequently are coated with a siccative coating.

17 Claims, 5 Drawing Sheets

Metal Exposure Testing: Polyethylene vs. Control

Metal Exposure Testing: Polyethylene vs. Control

FIG. 1

Metal Exposure Testing: Polyethylene + Conversion Coating

FIG. 2

Metal Exposures: Polyethylene + Conversion Coating

FIG. 3

Mobility: Control vs. Polyethylene

Mobility: Conversion Coating vs. Prior Art EO/PO Conversion Coating - Polyethylene

FIG. 7

Metal Exposures: Variations in Cleanliness vs. Polyethylene

PROCESS FOR REDUCING METAL EXPOSURES OF SICCATIVE ORGANIC COATINGS

FIELD OF THE INVENTION

This invention relates to the art of chemically treating metal surfaces such as ferrous, zinc or aluminum surfaces to improve the properties thereof. More particularly, the invention relates to a process for treating such surfaces to improve their receptivity to organic or siccative coatings and to a process for reducing metal exposures coated with an organic or siccative coating.

BACKGROUND OF THE INVENTION

Metal surfaces generally are provided with various chemical treatments to provide desirable properties. The metal surfaces which may be treated include sheets, roll stock, coil stock, etc., or formed metal surfaces such as beverage containers (cans), structural materials for buildings, etc.

Metal cans such as aluminum cans are commonly used as containers for a wide variety of products. After the cans are formed, they are typically washed with various cleaners to remove aluminum fines and other contaminants from the surface. One undesirable result of these treatments is that water often is retained on the clean, rinsed metal cans which represents a major heat load for a dry off oven. For example, about 2.5 grams of retained water per metal can at a production rate of 2500 cans/minute represents over 200,000 kcal/hr. (8000 BTU/hr.) of energy input. Reducing the water load reduces the energy required. Additionally, faster drying may also allow an increase in production rate.

Conventional washes frequently result in a surface finish on the outside of the cans which has a deleterious effect on the efficient movement on the cans through the conveyor systems and onto or off the printer mandrels. It is important, therefor, in the can processing industry, and in particular, the aluminum can processing industry to reduce the coefficient of friction on the outside surface of the cans to improve their mobility without adversely affecting the adhesion of printing, paints or lacquers applied thereto. Cans characterized as having poor mobility generally have higher coefficients of static and kinetic friction. In the commercial can processing operation, there are numerous locations where the cans stop moving momentarily and must start again from rest. The mobility problem is particularly important when the cans are loaded on and ejected from the mandrels of high-speed printers. Other locations in the manufacturing process where the mobility problem is evident is where cans flow through the single file conveyors called "single filers." A high coefficient of static friction generally prohibits an increase in line speed, production speed and production output, results in frequent jammings and printer misfeed problems, and a general loss of production due to increased rates of damage to the cans.

A reduction in the coefficient of static friction on the outside surface improves can mobility through the conveyor systems, especially the single filers. A reduction in the coefficient of static friction (C.O.S.F.) also results in reduced printer rejects. It is therefore desirable to reduce the liquid residue remaining on cans after various aqueous treatments and to improve the mobility of the cans through the can processing equipment.

Thus, a need has arisen in the aluminum can manufacturing industry to modify the coefficient of static friction on the outside surface of the cans to improve their mobility without adversely affecting the application of paints or inks. The reason for improving the mobility of aluminum cans is the general trend in this manufacturing industry to increase production without additional capital investments in building new plants. The increased production demand is requiring can manufacturers to increase their line and printer speeds to produce more cans per unit of time.

A number of patents have described procedures and chemical treatments for improving the mobility of formed metal surfaces, particularly beverage containers. These patents generally describe lubricants and surface conditions for formed metal surfaces which are capable of improving the mobility of aluminum cans without adversely affecting the adhesion of paints or lacquers applied thereto.

U.S. Pat. No. 4,599,116 describes an alkaline cleaning process for aluminum container surfaces. The aqueous alkaline cleaning composition contains an alkalinity agent, a complexing agent to chelate at least some of the metal ions removed from the metal surface by the cleaning solution, and at least one surfactant to remove organic soils from the surfaces of the container and to inhibit white-etch staining of the surfaces. The reference indicates that following cleaning a conversion coating can be applied to the surface of the can and the application of this conversion coating enhances the mobility of the cans as they are conveyed through track work.

U.S. Pat. Nos. 4,859,351; 4,944,889; 5,030,323; 5,064,500; and 5,080,814 describe lubricant and surface conditioners for application to aluminum cans. These patents indicate that the disclosed compositions reduce the coefficient of static friction on the outside surface of the cans which enhances mobility and thereby permits an increase in production line speed. The lubricant and surface conditioners disclosed in these patents are water-soluble alkoxylated surfactants, namely, organic phosphate esters; alcohols; fatty acids including mono-, di-, tri-, and poly-acids; fatty acid derivatives such as salts, hydroxy acids, amides, esters, ethers and derivatives thereof; and mixtures thereof. The references state that the lubricant and surface conditioner may be applied to the cans during the wash cycle, during one of the treatment cycles, during one of the rinse cycles, or after the final water rinse. Both acidic and alkaline wash cycles are disclosed.

U.S. Pat. No. 5,061,389 discloses a composition and process for reducing the coefficient of friction on the surface of formed metal structures, such as aluminum cans, by lubricating the surface with a blend of a polyethylene glycol ester with a fluoride compound.

U.S. Pat. No. 5,286,300 (Hating et al) describes a composition useful as a rinse aid for metal surfaces and for improving the mobility of formed metal surfaces. The composition comprises (A) from about 10% to about 90% by weight of at least nonionic polyoxyalkylene glycol comprising poly(oxypropylene)hydrophobic groups and poly (oxyethylene)hydrophilic groups, and (B) from about 10% to about 90% by weight of at least one alkoxy derivative of at least one ethoxylated and propoxylated glycol. A process is also described for improving the drainage of water for metal surfaces and for improving the mobility of formed metal surfaces.

Current EA regulations are requiring reductions in the amount of volatile organic content (VOCS) that paints and lacquers may contain. In the past, the majority of water-based coatings used in two-piece aluminum beer and beverage can industry had a VOC of about 3.6 lb./gal. Or higher. Environmental regulations now require that the VOC content of such water-based coatings be reduced to about 3.1 lb./gal. Or lower. It is well known in the can industry that satisfactory metal coverage becomes increasingly more difficult as VOC is reduced. In order to reduce the VOCS, the amount of solvent such as Butyl Cellosolve that are used in the coating compositions is significantly reduced. These solvents are more tolerant of the metal surfaces that are contaminated with organics such as mill oils applied on the coil or lubricants that are used in the process of forming the cans. The hydrophobic properties of the lubricant contamination does not allow the low VOC lacquers to wet the surface of the metal as evenly as the solvents. One method for overcoming this problem is to subject the metal surfaces to extra cleaning steps to lower the organic contamination level. The present invention enables low VOC lacquers to be more tolerant of these hydrophobic contaminates.

SUMMARY OF THE INVENTION

A process is described for reducing the metal exposure rating of metal surfaces which subsequently are coated with a siccative coating which comprises contacting said metal surface with an aqueous composition comprising a polyethylene selected from the group consisting of ethylene homopolymers, oxidized ethylene homopolymers, ethylene/acrylate copolymers and terpolymers containing ethylene, acrylates, and esters. A process is also described for improving the printability and mobility of formed metal surfaces and for reducing the metal exposure rating of the surfaces which subsequently are coated with a siccative coating.

DESCRIPTION OF THE PREFERRED EMBODIMENTS

It has now been discovered that aqueous compositions comprising polyethylene can be used to modify the surface characteristics of various metal surfaces such as ferrous, zinc or aluminum surfaces including alloys thereof to improve the surface properties of the metals. The metal surfaces which can be treated in accordance with the present invention include sheets, roll stock, coil stock, etc., or formed metal surfaces such as beverage containers, structural materials for buildings, etc. When the metal surfaces are treated in accordance with the process of the present invention, the coefficient of static friction of the surface is reduced, thereby improving the mobility of formed surfaces such as cans. The process of the invention also modifies the metal surface characteristics which enhance the application of siccative organic coatings, and in particular, low VOC coatings.

The enhanced siccative organic coating application to the metal surfaces treated in accordance with the present invention is demonstrated by a reduction in metal exposures which indicates a more complete coverage of the metal surfaces. Metal exposures are caused by the inability of a siccative coating to be applied uniformly and with complete coverage to a cleaned, and/or treated and dried metal surface. When the coating is applied, some areas of the metal surface may be left uncoated due to such non-uniformity, and the result is metal exposures.

In one embodiment, the process of the present invention for reducing the metal exposure rating of metal surfaces which subsequently are coated with a siccative organic coating comprises contacting the metal surfaces with an aqueous composition comprising a polyethylene. Polyethylenes.

Suitable polyethylenes include low and high density ethylene homopolymers, oxidized low density and oxidized high density ethylene homopolymers, copolymers containing ethylene and acrylates (e.g., acrylic acid, methacrylic acid, etc.), and terpolymers containing ethylene, acrylates and esters. Low density polyethylenes are characterized herein as having densities ranging from 0.85 to about 0.93 $g/cm^3$ and high density polyethylenes are characterized as having densities in the range of about 0.94 to about 1.00 $g/cm^3$. The polyethylenes generally have a weight average molecular weight of from about 1000 to about 10,000 or higher, more often from about 1000 to about 5000 or 6000.

The oxidized polyethylenes generally contain up to about 9% by weight of oxygen and have been oxidized to an acid number, as determined by a standardized titration of KOH, of from about 5 to about 55, more preferably between about 10 and 50, and most preferably between about 10 and 45. These oxidized polyethylenes typically have a density at 23° C., as determined by ASTM D-1505, in the range of from about 0.85 to about 1.05 g/cc, and more preferably in the range of from about 0.90 to about 100 g/cc and most preferably in the range of from about 0.95 to 1 g/cc. Typically these oxidized polyethylenes exhibit a Brookfield viscosity at a temperature of 140° C. of between about 185 and 6000 centipoises (hereinafter referred to as "cps"). More often, the Brookfield viscosity is in the range of from about 190 and 6000 cps, and most preferably in the range of between about 190 and 5500 cps.

In another embodiment, the oxidized polyethylene materials suitable for use in the present invention are low molecular weight oxidized polyethylene homopolymers which have an average molecular weight of less than about 5000, determined by vapor phase osmometry using phenetol as solvent. Preferably the number average molecular weight is about 1000 to 4000 and most preferably about 1500 to 2500. The polyethylenes in this embodiment preferably have been oxidized to an acid number of about 10 to 35, more preferably about 12 to 28 and most preferably from about 13 to 20. These oxidized polyethylenes preferably have a softening point as determined by ASTM E-28 of about 85° C. to about 145° C., more preferably about 95° C. to about 140° C. These oxidized polyethylenes have a Brookfield viscosity at 140° C. of about 120–300 cps and more often from about 170 to 250 cps. The oxidized polyethylenes described above are readily emulsifiable in water.

The oxidized polyethylenes which are useful in the present invention can be obtained by oxidizing polyethylenes with air or oxygen by conventional procedures. Suitable methods are described in U.S. Pat. No. 3,060,163 to Erchak, U.S. Pat. No. 3,222,711 to Bush et at, U.S. Pat. No. 3,917,893 to Marshall et al, and U.S. Pat. No. 4,129,507 to Marshall et al, which patents are all hereby incorporated by reference.

Polyethylenes useful in the present invention are also commercially available from various sources. For example, polyethylenes are available from Allied Signal Corp. under the general designation A-C® polyethylene which are identified as low and high density ethylene homopolymers and copolymers. For example, A-C® 316, 325 and 392 polyethylenes are identified as low molecular weight, high density oxidized polyethylenes, and A-C® 629, 655 and 680 polyethylenes are identified as low molecular weight, low density oxidized polyethylenes. A-C® 540 polyethylene is identified as a low molecular weight, ethylene/acrylic acid copolymer.

More particularly, A-C® 629 is identified in U.S. Pat. No. 5,238,731 as having a density of 0.93 g/cm$^3$, an acid number of 16, and a Brookfield viscosity of 200 cps; A-C® 392 is identified in the same patent as having a density of 0.99 g/cm$^3$, an acid number of 30, and a Brookfield viscosity of 4500 when measured at 140° C. A-C® 680 is identified in U.S. Pat. No. 4,371,658 as being an oxidized polyethylene having an acid number of about 14 to 18 and a softening point of about 105° C. to 110° C. A-C® 316 is described in Allied Signal literature as an oxidized polyethylene having a density of 0.98 g/cm$^3$ and an acid number of 15–18.

Polyethylenes also are available from BASF Corporation under the general trade designation Luwax Polyethylene and Copolymer Waxes. The polyethylenes range in weight average molecular weight between about 3000 and 6500. Examples of low density homopolymers include those identified under the trade designations Luwax A, AL60, AL61, AM6, AM3 and AL3. For example, Luwax A has a density of 0.92 g/cm$^3$ and a weight average molecular weight of 6000, and Luwax AM3 has a density of 0.92 g/cm$^3$ and a molecular weight of 3000. Examples of high density ethylene homopolymers include Luwax AH6 having a melting point of 110° C., a density of 0.94 g/cm$^3$ and a weight average molecular weight of 6000; and Luwax AH3 having a melting point of 109° C., a density of 0.945 g/cm$^3$ and a weight average molecular weight of 3000. Several oxidized polyethylenes are available from BASF Corporation under the general designation "OA." Luwax OA is an oxidized polyethylene having a density of 0.96 g/cm$^3$, an acid number of 22, and a weight average molecular weight of about 4000. Luwax OA 2 has a density of 0.97 g/cm$^3$, an acid number of 22, and a weight average molecular weight of about 4000. Luwax OA 3 is an oxidized polyethylene having a density of 0.99 g/cm$^3$, an acid number of 23, and a weight average molecular weight of about 8000. Luwax OA 5 is an oxidized polyethylene having a density of 0.97 g/cm$^3$, an acid number of 16, and a molecular weight of about 4000.

Oxidized low molecular weight polyethylenes also are available from the Petrolite Polymers Division of the Petrolite Corp. For example, Petrolite E-1040 is a commercially available oxidized low molecular weight polyethylene.

Ethylene copolymers also are available from BASF. For example, an ethylene-acrylic acid copolymer is available under the designation Luwax EAS 1, and this copolymer has a density of 0.935 g/cm$^3$, an acid number of 43, and a molecular weight of 6000. Luwax EVA 1 is an ethylene-vinyl acetate copolymer having a melting point of 87° C., a weight average molecular weight of 6500, and a density of 0.925 g/cm$^3$.

A commercially available aqueous emulsion containing an oxidized polyethylene which is useful in the present invention is Experimental Emulsion 29925 from Michelman Inc., Cincinnati, Ohio. This emulsion is based on A-C® 316 and is believed to contain about 25% solids as A-C® 316 which has been reacted with about 10 moles of ethylene oxide.

The properties of the polyethylenes contained in the aqueous mixtures used in the present invention may be modified by, for example, by reacting the oxidized polyethylenes, the ethylene-acrylic acid copolymers, etc., with alkylene oxides such as ethylene oxide, propylene oxide, or mixtures thereof. Various amounts of the alkylene oxides can be reacted with the oxidized polyethylenes and ethylene-acrylic acid copolymers in amounts ranging from about 1 to about 50 moles of alkylene oxide can be reacted per mole of polyethylene. Generally, the polyethylenes can be reacted with from about 1 to about 30 moles of ethylene oxide, propylene oxide, or mixtures thereof, and more often, the polyethylenes are reacted with from about 5 to about 20 moles of the alkylene oxide. The modification of the polyethylenes in this manner generally improves the water-solubility or water-emulsifiability characteristics of the polyethylenes.

Surfactants and Emulsifiers.

The stability of the mixtures of water and polyethylenes used in the method of the present invention may be improved by incorporating into the mixture, one or more surfactants or emulsifiers. Generally, the surfactants or emulsifying agents are nonionic compositions, and in one embodiment, the surfactants and emulsifiers are non-nitrogen-containing nonionic compositions.

The nonionic surfactants may be those containing ether linkages and which are represented by the following general formula wherein R is a hydrocarbon group containing from 6 to 60 carbon atoms, R' is an alkylene group containing 2 or 3 carbon atoms or mixtures thereof, and n is an integer of from 2 to 100. Such surfactants are produced generally by treating fatty alcohols or alkyl-substituted phenols with an excess of ethylene oxide or propylene oxide. The alkyl carbon chain may contain from about 14 to 40 carbon atoms and may be derived from a long chain fatty alcohol such as oleyl alcohol or stearyl alcohol.

Nonionic polyoxyethylene surfactants of the type represented by the above formula are available commercially under the general trade designations "Surfynol" by Air Products Chemicals, Inc., "Pluronic" or "Tetronic" by BASF Corp., Chemical Division; "Tergitol" by Union Carbide; and "Surfonic" by Texaco Chemicals. Examples of specific polyoxyethylene condensation products useful in the aqueous alkaline cleaner compositions of the present invention include "Surfynol 465" which is a product obtained by reacting about 10 moles of ethylene oxide with one mole of tetramethyldecynediol. "Surfynol 485" is a product obtain by reacting 30 moles of ethylene oxide with tetramethyldecynediol. "Pluronic L35" is a product obtained by reacting 22 moles of ethylene oxide with propylene glycol; "Tergitol TMN 3" is an ethoxylated trimethylnonanol with an HLB of 8.3, and "Tergitol TMN 6" is an ethoxylated trimethylnonanol with an HLB of 11.7. "Surfonic N95" is an ethoxylated nonyl phenol with an HLB of 12.9 and "Pluronic L61" is a block copolymer of propylene oxide and ethylene with an HLB of from 1 to 7.

Another type of nonionic ethoxylated surfactant which is useful in the aqueous mixtures used in the present invention are block copolymers of ethylene oxide and propylene oxide based on a glycol such as ethylene glycol or propylene glycol. The copolymers based on ethylene glycol generally are prepared by forming a hydrophilic base by reaction of ethylene oxide with ethylene glycol followed by condensation of this intermediate product with propylene oxide. The copolymers based on propylene glycol similarly are prepared by reacting propylene oxide with propylene glycol to form the intermediate compound which is then condensed with ethylene oxide. By varying the proportions of ethylene oxide and propylene oxide used to form the above copolymers, the properties may be varied. Both of the above types of copolymers are available commercially such as from BASF Chemicals under the general trademark "Pluronic". The condensates based on ethylene glycol are identified as the "R" series, and these compounds preferably contain from about 30 to about 80% of polyoxyethylene in the molecule and may be either liquids or solids. The condensates based on propylene glycol are identified generally by BASF as the "F", "L", or "P" series, and these may contain from about 5 to about 80% of ethylene oxide. The "L" series of propylene glycol based copolymers are liquids, the "F" series are solids, and the "P" series are pastes. The solids and pastes can be used when they are soluble in the aqueous cleaner solutions. The molecular weights of these block copolymers range from about 400 to about 14,000.

In one embodiment, the surfactant composition included in the aqueous mixtures comprising a polyethylene comprises a mixture of (A) from about 10% to about 90% by weight of at least one nonionic polyoxyalkylene glycol comprising poly(oxypropylene)hydrophobic groups and poly(oxyethylene)hydrophilic groups, and (B) from about 10% to about 90% by weight of at least one alkoxy derivative of at least one nonionic ethoxylated and propoxylated glycol.

The nonionic glycols of (A) and (B) comprise poly(oxypropylene)hydrophobic groups and poly(oxyethylene) hydrophilic groups. The molecular weight range of the polyoxyalkylene glycols may range from about 1100 to about 14,000 and higher. The arrangement of the hydrophobic and hydrophilic groups may be varied as desired. In one embodiment, the polyoxyalkylene glycols are formed from a hydrophobic poly(oxypropylene) group which is formed by the controlled addition of propylene oxide to the two hydroxyl groups of a propylene glycol nucleus. The length of the resulting hydrophobe can be varied as desired to provide molecular weights of from about 800 to several thousands. The hydrophobe is then reacted with ethylene oxide to form hydrophilic poly(oxyethylene) groups in controlled amounts to result in a variety of nonionic surfactants containing from 10% to 80% by weight of the hydrophilic poly(oxyethylene) groups. Nonionic polyoxyalkylene glycols of this type may be represented by the formula wherein a and c are each independently at least 1, the sum of a+c is from 2 to about 100, and b is from about 5 to about 100. In one embodiment, b is from about 15 to about 35.

As noted above, the poly(oxyethylene) group ($CH_2CH_2O$) is a hydrophilic group whereas the poly(oxypropylene) group ($CH(CH_3)CH_2O$) is a hydrophobic group. In one embodiment of the invention, the glycol of (A) contains less than 40% of the hydrophilic group, and more often, the glycol of (A) will contain from about 5 to about 40% by weight of the hydrophilic group.

The nonionic polyoxyalkylene glycol comprising poly(oxypropylene)hydrophobic groups and poly(oxyethylene) hydrophilic groups may also be characterized by the formula wherein a and c are each independently at least 1, the sum of a+c is from 2 to about 100, and b is from about 5 to about 100. The polyols characterized by Formula II contain a poly(oxyethylene)hydrophilic base, and such polyols can be prepared by initially reacting ethylene oxide with the two hydroxy groups of an ethylene glycol nucleus. The resulting hydrophile can be tailored to any desired length (from about 800 to several thousand in molecular weight). The hydrophile can then be reacted with propylene oxide which reacts with the hydroxyl groups of the hydrophile to form hydrophobic poly(oxypropylene) groups of controlled lengths whereby the resulting polyols contain from about 10 to about 80% by weight of the poly(oxypropylene) groups.

The ethoxylated and propoxylated glycol of (B) may be obtained by randomly reacting ethylene oxide and propylene oxide with a glycol such as ethylene glycol. The glycols of (B) may also be block copolymers of ethylene oxide and propylene oxide.

Nonionic polyoxyalkylene glycols are the type represented by Formula I are available commercially from a variety of sources including BASF Wyandotte Corporation under the general designation "Pluronic". Examples of such oxyethylated poly(oxypropylene) glycols include "Pluronic L31" wherein the polyoxypropylene hydrophobe base has a molecular weight of 950 and the base has been reacted with ethylene oxide to provide a poly(oxyethylene)hydrophile unit representing 10% of the total molecule; "Pluronic L63" wherein the polyoxypropylene hydrophobe base has a molecular weight of 1750 and has been reacted with ethylene oxide to provide a poly(oxyethylene)hydrophile unit representing 30% of the total molecule; "Pluronic L61" wherein the polyoxypropylene hydrophobe has a molecular weight of 1750 and the total molecule contains 10% of the poly(oxyethylene)hydrophile unit; "Pluronic L43" wherein the polyoxypropylene hydrophobe base has a molecular weight of about 1200, and the total molecule contains about 30% of the poly(oxyethylene)hydrophile; and "Pluronic L64" wherein the poly(oxypropylene)hydrophobe has a molecular weight of 1750, and the molecule contains about 40% by weight of the poly(oxyethylene)hydrophile.

Nonionic polyoxyalkylene glycols of the type represented by Formula I are also available from Mazer Chemicals, Inc. under the general designation Macol, and specific examples include Macol 35, Macol 42, Macol 44, Macol 46, Macol 72, etc. Examples of nonionic polyoxyalkylene glycols of the type represented by Formula II which are available from Mazer Chemicals, Inc. include Macol 31, Macol 32, Macol 33 and Macol 34. Polyoxyalkylene glycols of the type represented by Formula I also are available from Alkaril Chemicals, Ltd., a GAF company under the general trade designation Alkatronic PGP such as Alkatronic PGP 10-1, Alkatronic PGP 10-5, Alkatronic PGP 18-1, etc.

Nonionic polyoxyalkylene glycols of the type represented by Formula II are available commercially from sources such as BASF-Wyandotte Corporation under the general designation Pluronic "R". Specific examples include Pluronic 10R5, 10R8, Pluronic 17R8, Pluronic 22R4, Pluronic 31R2 and Pluronic 31R4. Polyoxyalkylene glycols of the type represented by Formula II which are available from Alkaril Chemicals, Ltd., include Alkatronic EGE 25-2 and Alkatronic EGE 33-1.

The second component present in the surfactant mixture useful in the present invention is (B) at least one alkoxy derivative of at least one ethoxylated and propoxylated glycol. Component (B) may be an alkoxy derivative of a glycol randomly ethoxylated and propoxylated or an alkoxy derivative of a block copolymer of propylene oxide and ethylene oxide. More particularly, (B) is at least one alkoxy derivative of at least one nonionic polyoxyalkylene glycol comprising poly(oxypropylene)hydrophobic groups and poly(oxyethylene)hydrophilic groups. In one embodiment, the alkoxy groups contain from about 3 to about 6 carbon atoms. The alkoxy derivative useful as component (B) in the compositions of the present invention may be a derivative of any of the polyoxyalkylene glycols described above as exemplifying polyalkylene glycols of (A). Thus, for example, the alkoxy derivative may be an alkoxy derivative of the nonionic polyoxyalkylene glycols of the type represented above by Formulae I and II, and any of the above-described polyoxyalkylene glycols may be converted to the alkoxy derivatives by reaction with an alkanol such as n-propanol, n-butanol, n-pentanol, n-hexanol by procedures well known to those skilled in the art. In addition, some of the alkoxy derivatives (B) are available commercially. For example, n-butoxy polyoxyethylene polyoxypropylene glycols are available from Mazer Chemicals, Inc. under the trade designations Macol 660, Macol 3520 and Macol 5100. Ucon HB 5100 is a commercially available butyl ether of a polyoxyethylene polyoxypropylene glycol containing about 50% polyoxyethylene groups.

These surfactant compositions comprising mixtures of nonionic surfactants (A) and (B) described above are described in detail in U.S. Pat. NO. 5,286,300 (Hnatin). Such compositions are also available commercially, and one such composition is available from Man-Gill Chemical, Cleveland, Ohio under the designation DR-1597.

Anionic surfactants also may be included in the aqueous mixtures of the invention. In one embodiment, the anionic surfactants are sulfates or sulfonates. As examples of suitable anionic surfactants there may be cited the higher alkyl mononuclear aromatic sulfonates such as the higher alkyl benzene sulfonates containing from 10 to 16 carbon atoms in the alkyl group and a straight or branched chain, e.g., the sodium salts of decyl, undecyl, dodecyl tridecyl, tetradecyl, pentadecyl or hexadecyl benzene sulfonate and the higher alkyl toluene, xylene and phenol sulfonates; alkyl naphthalene sulfonate, and sodium dinonyl naphthalene sulfonate.

Other anionic surfactants are the olefin sulfonates, including long chain alkene sulfonates, long chain hydroxyalkane sulfonates or mixtures thereof. These olefin sulfonate detergents may be prepared, in known manner, by the reaction of $SO_3$ with long chain olefins having 8–25, preferably 12–21 carbon atoms. Examples of other sulfate or sulfonate detergents are paraffin sulfonates, such as the reaction products of alpha olefins and bisulfites (e.g., sodium bisulfite). These include primary paraffin sulfonates of about 10–20, preferably about 15–20 carbon atoms; sulfates of higher alcohols; and salts of α-sulfofatty ester (e.g., of about 10 to 20 carbon atoms, such as methyl α-sulfomyristate or α-sulfotallate).

Examples of sulfates of higher alcohols are sodium lauryl sulfate, sodium tallow alcohol sulfate, or sulfates of mono- or diglycerides of fatty aids (e.g., stearic monoglyceride monosulfate), alkyl poly(ethoxy) ether sulfates such as the sulfates of the condensation products of ethylene oxide and lauryl alcohol (usually having 1 to 5 ethenoxy groups per molecule); lauryl or other higher alkyl glyceryl ether sulfonates; aromatic poly(ethenoxy) ether sulfates such as the sulfates of the condensation products of ethylene oxide and nonyl phenol (usually having 1 to 20 oxyethylene groups per molecule preferably 2–12).

Of the various anionic surfactants mentioned, the preferred salts are sodium salts and the higher alkyls are of 10 to 18 carbon atoms, preferably of 12 to 18 carbon atoms. Specific exemplifications of such compounds include: sodium linear tridecyl benzene sulfonate; sodium linear pentadecyl benzene sulfonate; sodium p-n-dodecyl benzene sulfonate; sodium lauryl sulfate; potassium coconut oil fatty acids monoglyceride sulfate; sodium dodecyl sulfonate; sodium nonyl phenoxy polyethoxyethanol (of 30 ethoxy groups per mole); sodium propylene tetramer benzene sulfonate; sodium hydroxy-n-pentadecyl sulfonate; sodium dodecenyl sulfonate; lauryl polyethoxyethanol sulfate (of 15 ethoxy groups per mole); and potassium methoxy-n-tetradecyl sulfate.

A series of sulfate and sulfonate anionic surfactants are available from the Henkel Corporation under the general trade designation "Sulfotex". For example, Sulfotex LAS-90 is reportedly a sodium dodecyl benzene sulfonate and Sulfotex LCX is a sodium lauryl sulfate.

The anionic surfactant may be of the phosphate mono- or diester type. These esters may be represented by the following formulae:

(monoester)

(diester)

wherein R is a fatty chain containing 10 to 18 carbon atoms; each n is independently an integer from 0 to 5; and M is any suitable cation such as alkali metal, ammonium and hydroxyalkyl ammonium.

These types of surfactants are also well known and are commercially available. One series is available from the GAF Corporation under the general trade designation "GAFAC". For example, GAFAC 510 and the G for "R" series are anionic surfactants reported to be free acids of a complex phosphate ester. Sodium and potassium salts of complex phosphate esters also are available under the GAFAC designation.

Anionic surfactants are also available from Rohm & Haas Company under the general trade designation "Triton". For example, Triton H-55 and H-66 are phosphate surfactants (potassium salts); Triton QS-30 and QS-44 are anionic phosphate surfactants in the free acid form; Triton W-30 is a sodium salt of an alkyl aryl polyether sulphate; and Triton DF-20 is a modified ethoxylate.

The amount of surfactant or combination of surfactants included in the aqueous mixtures is an amount which is effective to improve the emulsifiability of the polyethylene in water. In one embodiment, this amount is also sufficient to provide a substantially 100% water-break-free surface. A 100% water-break-free surface is achieved when the water "sheets off" leaving a continuous thin layer of water after rinsing. A 100% water-break-free surface represents a surface that is free of lubricants or oils. Typically, the amount of surfactant or combination of surfactants included in the operating or working aqueous mixtures will range from about 0.003 to about 5 g/l with concentrations of from about 0.02 to about 1 g/l being particularly useful.

Aqueous Mixtures.

The amount of polyethylene employed in the operable aqueous mixtures is sufficient such that when the aqueous mixture is applied (e.g., spray, immersion, etc.) to at least part of the interior and exterior surface of a formed surface such as an aluminum can, the coefficient of static friction (C.O.S.F.) on said exterior surface is reduced to a level that is lower than would be obtained on a can surface of the same type without the application of such composition and/or the amount of polyethylene in the aqueous mixture is sufficient to reduce the metal exposure rating of interior metal surfaces which are subsequently coated with a siccative coating. Preferably, the C.O.S.F. (as described more fully below) is reduced to a level of about 0.90 or below, more preferably less than about 0.85, more preferably less than about 0.80. In one embodiment, the concentration of the polyethylene in the operable aqueous mixtures is from about 0.01% to about 3% by weight preferably about 0.03% to about 1.5% by weight of the aqueous mixture. The aqueous mixtures can also be prepared as concentrates and later diluted to form an operable mixture. Concentrates may contain from 10% to 50% by weight of the polyethylene and more often contain from 20% to 30% by weight of the polyethylene. In one embodiment, the water employed in such aqueous mixtures and/or concentrates is deionized water.

In one embodiment, the aqueous mixtures containing the polyethylenes are used in one or more wash or rinse stages that are used on metal sheets, roll stock, or coil stock and in the manufacturing of cans following the can forming step. These stages are discussed in greater detail below. In this embodiment the polyethylene and optional surfactants and/or emulsifiers can be added directly to the wash or rinse treatment composition, and the resulting aqueous composition is the aqueous mixture described above and contemplated herein. The polyethylene can be initially mixed with water to form a concentrate as discussed above. These concentrates can also include one or more additional chemicals (e.g., acid cleaners, alkaline cleaners, surfactants, conditioners, conversion coating chemicals, antifoam agents, antimicrobial or biocidal agents, etc.) that are used during one or more of the wash or rinse stages. The concentrate is then diluted with water to form the desired wash or rinse composition.

Any antimicrobial or biocidal agent, except those having some detrimental effect on the mobility enhancing properties or the stability of the inventive aqueous composition, may advantageously be added to the inventive aqueous mixtures in an amount sufficient to effectively inhibit the growth of microorganisms. Hydrogen peroxide and ammonium bifluoride are useful for this purpose. The inventive aqueous mixtures can contain up to about 3% by weight of hydrogen peroxide or ammonium bifluoride.

Any antifoam agent, except those which have some detrimental effect on the metal exposure reduction, and/or the mobility enhancing properties already described, or the stability of the aqueous mixture, may advantageously be added to the aqueous composition in an amount effective to decrease the amount of foaming observed during preparation and/or use of the compositions. A useful antifoam agent is a combination of wax, low volatility liquid paraffin hydrocarbons, and high molecular weight fatty acid derivatives. The aqueous mixtures can contain up to about 2% by weight of said antifoam agent, and in some instances up to about 1% by weight.

Conversion Coatings.

In one embodiment, the metal surfaces, including ferrous, zinc and aluminum surfaces which are to be treated with the aqueous mixtures of the present invention may be surfaces which have a conversion coating thereon. It has been discovered that the aqueous mixtures of this invention containing a polyethylene can be applied over conversion coatings without adversely affecting the desirable properties imparted by the conversion coating. Conversion coatings have been used in this industry to enhance the corrosion-resistance of an unpainted metal surface or to prepare a metal surface for the reception of a final finish or siccative coating such as a paint, enamel or sanitary lacquer. Chromium conversion coatings have been used for many years but have fallen into disfavor in view of the waste disposal and handling problems due to the corrosive action of the chromium compositions.

In one embodiment, the metal surfaces treated in accordance with the present invention have been provided with a chromium-free conversion coating. Any of the chromium-free conversion coatings known in the art can be utilized in the process of the present invention. The conversion coatings generally are applied to the metal during the cleaning process and more particularly, may be applied to the metal surfaces after the acid or alkaline cleaner stages and prior to the water rinse stages. One particularly useful chromium-free conversion coating is deposited from an aqueous acidic treating composition containing dissolved metal ions selected from the group consisting of hafnium, zirconium and mixtures thereof, fluoride ions and, optionally, a bath-soluble vegetable tannin compound. These aqueous acidic mixtures also may contain phosphate ions and other metal ions such as titanium, lithium, and mixtures thereof. The aqueous acidic treating solutions may contain only hafnium ions or only zirconium ions as well as mixtures of the two metals. In one preferred embodiment, the treating solution contains zirconium ions or predominantly zirconium ions, fluoride ions, a vegetable tannin compound, and a phosphate compound. The aqueous acidic compositions also may contain nitric acid or a nitrate compound.

These aqueous acidic coating compositions containing zirconium or hafnium are described in more detail in U.S. Pat. No. 4,338,140. The '140 patent also describes procedures for preparing and applying such coating compositions to various metal surfaces. The disclosure of U.S. Pat. No. 4,338,140 is hereby incorporated by reference for such disclosures. Aqueous acidic coating compositions containing zirconium ions, fluoride ions, vegetable tannin and phosphate ion are available from Man-Gill Chemical Company, and one such composition is available under the designation DR-1479.

The following examples illustrate the aqueous mixtures of the present invention containing a polyethylene. Unless otherwise indicated in the following examples and elsewhere in the specification and claims, all parts and percentages are by weight, temperatures about ambient, and pressures are at or near atmospheric pressure.

EXAMPLE 1

| | |
|---|---|
| A-C ® 392 polyethylene | 20% |
| Nonionic surfactant | 1.0% |
| Water | 79% |

EXAMPLE 2

| A-C ® 316 polyethylene | 25% |
|---|---|
| Pluronic L-43 | 0.5% |
| Ucon HB-5100 | 0.5% |
| Water | 74% |

EXAMPLE 3

| A-C ® 316 polyethylene reacted with 10 moles of ethylene oxide | 25% |
|---|---|
| Water | 75% |

EXAMPLE 4

| Luwax EAS-1 | 23% |
|---|---|
| Pluronic L-43 | 1% |
| Macol 5100 | 1% |
| Water | 75% |

EXAMPLE 5

| Luwax OA 2 | 25% |
|---|---|
| Pluronic L-43 | 2% |
| Water | 73% |

EXAMPLE 6

| Luwax OA reacted with 8 moles of ethylene oxide | 23% |
|---|---|
| Water | 77% |

EXAMPLE 7

| Luwax EAS 1 (ethylene-acrylic acid copolymer) | 25% |
|---|---|
| Water | 75% |

Aluminum Can Washing.

The can washing process in which the aqueous mixtures comprising a polyethylene are utilized can be any process adapted for washing aluminum cans. In one embodiment, the cans that are washed are taken from a drawn and ironed (D&I) forming process. These cans generally have oils, aluminum fines and other contaminants adhered to their surface. These contaminants must be removed before the cans can be lacquered, painted, printed, etc. Also, as noted above, chemical conversion coatings can be deposited on the cans during the wash process to promote adhesion of subsequently applied paints, lacquers and the like, improve mobility, prevent dome discoloration which can occur during the pasteurization of beer, and/or enhance corrosion resistance. A conditioning rinse can be applied to improve cleanliness.

Most aluminum can washing operations employ six sequential wash or rinse stages:

Stage 1: Prewash
Stage 2: Acid or Alkaline Cleaner
Stage 3: Acid rinse
Stage 4: Conditioning rinse or conversion coating
Stage 5: Water rinse
Stage 6: Deionized Water Rinse During each stage, a bath containing the desired wash or rinse composition is employed. This wash or rinse composition is preferably applied to the cans via spraying although other application techniques such as immersion can be used. Following Stage 6, the cans are dried and then conveyed to a work station remote from the washing operation wherein they are further processed (e.g., printed, lacquered, painted, etc.).

The aqueous mixtures comprising a polyethylene can be used during one or more of Stages 2 to 6, and are preferably used in either Stage 5 or Stage 6. They are preferably mixed with the other ingredients of the wash or rinse and applied to the cans with such other ingredients.

Those skilled in the art will recognize that, in some instances, one or more of the foregoing Stages 1–6 can be eliminated, two or more stages can be merged into one, or additional treatment stages can be added. When such modifications are employed, it will be understood that the inventive mobility enhancer can be applied to the surface of the can during any stage from the cleaning stage (i.e., Stage 2) to just prior to the drying stage.

The prewash stage (Stage 1) is used to remove heavy accumulations of oil and aluminum fines from the can surface before entering the acid or alkaline cleaning stage (Stage 2). In one embodiment, the prewash is operated at a temperature in the range of about 60° F. to about 150° F., preferably about 80° F. to about 130° F., more preferably about 110° F. to about 120° F., and a pH that is preferably in the range of about 2 to about 5, more preferably about 2.5 to about 3.5. Typically, the cans are sprayed for about 10 to about 60 seconds, more preferably about 20 to about 40 seconds, more preferably about 30 seconds.

The cleaning stage (Stage 2) is used to remove the balance of the organic and inorganic soils remaining on the can surface after the prewash. Either an acidic or an alkaline cleaner can be used in this step. The organic soils include water-soluble lubricants from the copper and bodymaker operations, rolling oils, and general shop dirt. The inorganics include aluminum fines and natural oxide or corrosion. Aluminum fines are small particles of aluminum which are the result of the aluminum being abraded during the forming operation.

In one embodiment of the invention, an aqueous alkaline cleaner is used during Stage 2. These cleaning compositions preferably comprise at least one inorganic base and, optionally, at least one complexing agent. The inorganic base is provided in an amount sufficient to achieve satisfactory removal of aluminum fines from the container surfaces. The complexing agent is provided in an amount sufficient to complex at least some of the metal ions in the operating bath. These ions tend to form undesirable precipitates in the aqueous alkaline medium.

The inorganic base may comprise any one or a combination of bath-soluble compounds including alkali or alkaline earth metal borates, carbonates, hydroxides, phosphates, and mixtures thereof. Alkali metal hydroxides and alkali metal carbonates are preferred materials. A mixture of sodium hydroxide and sodium carbonate can be used. The concentration of the inorganic base is preferably at a sufficient level to remove substantially all of the aluminum fines on the container surfaces while at the same time not unduly etching the aluminum surface so as to provide a clean, bright, reflective appearance. The inorganic base is typically employed at a sufficient concentration to provide an operating pH in the range of about 8 to about 13. Preferably, the pH of the operating cleaning solution is controlled within a range of about 10 to about 13, more preferably about 11.5 to about 12.5, and in one embodiment it is advantageously in the range of about 11.7 to about 12.1. In order to provide the foregoing alkalinity, the inorganic base is typically employed at a concentration of about 0.05 to about 10 g/l with concentrations of about 0.4 to about 3.5 g/l being useful.

The complexing agent may comprise any one or a combination of bath-soluble compounds which are effective to complex at least some of the metal ions present in the operating bath to avoid the formation of deleterious precipitates. For this purpose, sugar acids as well as salts thereof are useful. Included among such complexing agents are gluconic acid, citric acid, glucoheptanoic acid, sodium tripolyphosphate, EDTA, tartaric acid or the like, as well as the bath-soluble and compatible salts thereof and mixtures thereof. Generally, the concentration of the complexing agent in the operating bath is controlled within a range of about 0.01 up to about 5 g/l with concentrations of from about 0.05 to about 1 g/l being useful.

In another embodiment, an aqueous acidic cleaner is used during Stage 2. These acidic compositions generally comprise at least one inorganic acid. Examples of such inorganic acids include sulfuric acid, the hydrohalic acids and mixtures thereof. Hydrofluoric acid is a particularly useful hydrohalic. A source of fluoride ions (e.g., ammonium bifluoride) can be used as an alternative to hydrofluoric acid. Mixtures of sulfuric acid and hydrofluoric acid are useful.

In one embodiment, sulfuric acid is employed in the acidic cleaning composition at a sufficient concentration to maintain the pH between about 0.5 and about 6, preferably about 0.5 and 2.5. Concentrations of sulfuric acid of about 0.1 to about 60 grams/liter, preferably from about 1 to about 10 grams/liter can be used. The concentration of sulfuric acid can be at a level of about 4 to about 8 grams/liter.

In one embodiment, hydrofluoric acid is present in the acidic cleaning composition at a concentration of about 0.005 to about 0.7 gram/liter, preferably about 0.005 to about 0.1 gram/liter. The hydrofluoric acid can be present at a concentration of about 0.01 to about 0.03 gram/liter.

The aqueous alkaline and acidic cleaner compositions may contain at least one surfactant. More often, a combination of at least two surfactants are utilized. The surfactants are used to effect an efficient removal of lubricants and organic soils of the types customarily employed in the drawing and forming of aluminum containers. Combinations of nonionic and anionic surfactants are particularly useful. Any of the nonionic and anionic surfactants described above may be used in the aqueous alkaline or acidic cleaner compositions.

The amount of surfactant or combination of surfactants included in the aqueous acid and alkaline cleaner compositions is an amount which is effective to remove contaminants from the surface of the container. In one embodiment, this amount is also sufficient to provide a substantially 100% water-break-free surface. A 100% water-break-free surface is achieved when the water "sheets off" leaving a continuous thin layer of water after rinsing. A 100% water-break-free surface represents a surface that is free of lubricants or oils. Typically, the amount of surfactant or combination of surfactants included in the operating or working aqueous acidic or alkaline cleaner will range from about 0.003 to about 5 g/l with concentrations of from about 0.02 to about 1 g/l being useful.

The aqueous acidic or alkaline cleaning composition is applied to the can surface at comparatively low to moderate temperatures of generally below about 150° F. to about ambient (i.e., about 60° F.) and preferably within a range of about 90° F. to about 130° F. The contacting of the can may be effected by flooding, immersion, or spraying of which the latter constitutes the preferred technique. In one embodiment, the cans are sprayed for about 10 to about 50 seconds, preferably about 20 to about 30 seconds. The makeup and replenishment of the cleaning composition is preferably performed by employing a concentrate of the several constituents in the appropriate proportions. The concentrate can be provided in the form of a dry particulate product and preferably, in the form of an aqueous concentrate containing from about 50% up to about 90% by weight water with the balance comprising the active ingredients present in the same relative proportions as employed in the final diluted operating bath.

The purpose of the rinse in Stage 3 is to completely remove all acidic or alkaline cleaner and soils from the can surface prior to subsequent treatment. In order to conserve water and to obtain the maximum benefit from the amount of water used, a two-stage counterflowed rinse can be used. After the cleaner stage blow-off, some washers use a spray rinse directed on the cans. This rinse can be followed by a blow-off and is commonly called a drag-out rinse. Recirculated water rinse can be used in Stage 3. This recirculated rinse can be supplied as fresh water or, in many instances, by counterflowed water from Stage 5. Spray pressures are regulated so as to balance input and output to the drag-out rinse with a minimum of overflow of the tank used in Stage 3. In one embodiment, tap or city water is used as the rinse water and an effective amount of sulfuric acid is added to provide a pH in the range of about 1.5 to about 3, preferably about 1.9 to about 2.1. The temperature of the rinse can be in the range of about 70° F. to about 150° F., preferably about 90° F. to about 120° F. In one embodiment, the cans are sprayed for about 1 to about 60 seconds, more preferably about 5 to about 20 seconds, more preferably about 15 seconds.

A conversion coating or conditioning rinse can be applied in Stage 4. In one embodiment of the invention, the aqueous mixture containing a polyethylene is applied to the can surface during this stage. The conversion coating, when applied, is used to enhance can transport mobility, protect against exterior dome staining which can occur during the pasteurization of beer, provide corrosion resistance, and promote adhesion of subsequently applied organic coatings such as paints, lacquers, printing inks, and the like. The conversion coating treatment, when applied, is applied to at least part of the exterior surface of the can and may be any one that is conventionally available including, for example, treatment solutions based on chromium (e.g., chromium phosphate) or titanium, zirconlure, or hafnium, with or without tannin. Exemplary of such conversion coating solutions and processes are those described in U.S. Pat. Nos. 4,017,334; 4,054,466; and 4,338,140, the teachings of which are incorporated herein by reference.

The conditioning rinse, when applied, is used to promote cleanliness of the can surface. In one embodiment, an aqueous composition containing sulfuric acid, hydrofluoric acid and boric acid is used.

The aqueous mixtures comprising a polyethylene, when applied during this stage 4, is applied at a sufficient level to provide the can with the desired reduction in metal exposure rating and improved mobility properties once the can passes through the final rinse stage (Stage 6) and is dried.

In one embodiment, the Stage 4 treatment bath has a pH in the range of about 1 to about 4, preferably about 1.8 to about 3, and a temperature in the range of preferably about 60° F. to about 150° F., more preferably about 90° F. to about 150° F., more preferably about 110° F. to about 130° F. The Stage 4 treating solution is preferably sprayed on to the cans for about 1 to about 60 seconds, more preferably about 5 to about 20 seconds, more preferably about 10 seconds.

The purpose of the rinse in Stage 5 is to remove all residual conversion coating or conditioning rinse chemicals from the can body prior to the final deionized water rinse of Stage 6. To conserve water and to obtain the maximum benefit from the water used, this rinse can be constructed and operated similar to Stage 3. In one embodiment, the Stage 5 water rinse is operated at ambient temperature and a pH in the range of about 4 to about 5. An inorganic acid, preferably sulfuric acid, is preferably used to achieve the desired pH. In one embodiment, the cans are sprayed for about 1 to about 60 seconds, more preferably about 5 to about 30 seconds, more preferably about 15 seconds.

The last process stage in the can washer is Stage 6 which is the deionized water rinse. By deionization, water purity as good as distilled water can be obtained. Deionized water is tap water (city or well water) from which all or most of the natural mineral salts (calcium, silicates, phosphates, etc.) have been removed by means of ion exchange columns. This stage is typically operated at a pH in the range of about 3 to about 5, preferably about 4 to about 4.5. An inorganic acid such as sulfuric acid is used to provide the desired pH. This stage is generally operated at ambient temperature, and in one embodiment the cans are sprayed for about 1 to about 60 seconds, more preferably about 5 to about 20 seconds, more preferably about 10 seconds. As mentioned previously, the aqueous mixtures of the invention comprising a polyethylene are usually added to this stage of the claimed process.

An antifoaming agent of the type discussed above can be used during one or more of Stages 2–6 to avoid objectionable foaming. Similarly, an antimicrobial or biocidal agent of the type discussed above can be added to the aqueous compositions used in any of Stages 2–6 to inhibit the growth of microorganisms. In one embodiment, the antifoaming agent and/or the antimicrobial or biocidal agent is combined with the inventive mobility enhancer in any of Stages 2–6, and preferably in Stage 2 or Stage 4.

Following the deionized water rinse, the cans are conveyed through a dry off oven to remove all moisture from the cans. The temperature of the dry off should be as low as possible to dry the cans. In one embodiment, temperatures of about 325° F. to about 375° F. are used, and the residence time for each can in the oven is about 20 seconds to about five minutes, preferably about 30 seconds to about two minutes, more preferably about one minute. From the dry off oven the cans are conveyed along a high-speed conveyor (e.g., conveyorized transfer lines, chutes, single filers, etc.) at typical rates in excess of about 1000 cans per minute (e.g., in excess of about 1600–1800 cans per minute, etc.) to another location in the manufacturing facility wherein the cans may be coated internally and/or externally with a siccative coating such as a sanitary lacquer, and/or the external surface is printed.

Siccative Organic Coating.

As noted above, the cleaned metal surfaces are generally coated with a siccative coating such as paints, varnishes, lacquers, etc., to form continuous films which are cured or otherwise hardened to provide protection as well as a decorative appearance to the metal. It has been discovered that the siccative organic coating compositions can be applied to the clean metal surfaces containing a film of the polyethylenes described above, and the presence of the polyethylene film improves the ability of the siccative organic coating composition to provide acceptable and improved metal coverage (reduced metal exposure) and improved adhesion of the siccative organic coating composition to the metal. The improved wetting/coverage of the surface by the siccative coating composition is observed particularly when the siccative coating composition is a composition characterized as having a low volatile organic content (VOC). Low VOC siccative coating compositions for the purpose of this invention are those compositions having a VOC of less than 3.5 lbs/gal., and more often about 3.1 lbs/gal. Or less. The presence of the polyethylene film on the metal surface enhances the application of siccative organic coating compositions, and in particular, the application of low VOC coatings. The siccative organic coating compositions useful in the present invention may be any of the siccative organic coating compositions normally used for coating metal surfaces and, more particularly, formed metal surfaces such as beverage containers, and such compositions include paints, enamels, sanitary lacquers, etc.

The siccative organic coating compositions which may be utilized in the present invention contain highly polar resins and principally thermosetting resins which can be, for example, acrylic resins such as acrylic acid resin, an acrylate resin or acrylamide resin, or a reaction product or a mechanical mixture of an alkyd resin in a water-soluble melamine resin, or a vinyl-modified unsaturated alkyd resin. The vinyl-modified unsaturated alkyd resins can be made by polymerization of a vinyl monomer with an alkyd resin composed of an unsaturated oil or fatty acid. In this application, the term "vinyl monomer" is intended to mean a monomer having a vinyl group ($-CH=CH_2$) in the molecule, such as an acrylic ester, for example, methyl acrylate and ethyl acrylate; a methacrylic ester such as methyl methacrylate; an unsaturated organic acid such as acrylic acid and methacrylic acid; and styrene. Low VOC coating compositions are described in the art such as in U.S. Pat. No. 5,196,481. The low VOC composition described in this patent comprises a polymeric binder surfactant and an epoxy-acrylic polymeric binder. More particularly, the polymeric binder surfactant comprises a terpolymer of ethylhexyl acrylate, methyl methacrylate and an acrylic acid.

Sanitary lacquers which are useful for providing a siccative organic coating on the metal surfaces are available commercially from, for example, ICI (Glidden Division). Two commercially available sanitary lacquers available from ICI have been utilized in the specific examples which follow, and these sanitary lacquers are illustrative of the siccative organic coating compositions which can be used in accordance with the present invention. ICI 640-C-552 is a sanitary lacquer from ICI which is characterized as having a VOC of about 3.6 lb./gal. Another sanitary lacquer available from ICI is ICI 640-C-1482 which is reported to have a VOC of 2.5.

The paints, lacquers, varnishes, etc., can be applied to the metal surfaces in accordance with the present invention by techniques well known to those skilled in the art. Such methods include dipping, spraying, brushing, etc.

An advantage of using the aqueous mixture of the invention comprising a polyethylene is that the polyethylene provides desired mobility enhancement to the cans without interfering with subsequent printing, lacquering and painting operations. It also does not detrimentally affect food and beverage products that are used to fill the cans. In this regard, for example, the polyethylene does not detrimentally affect the taste of beer that is used to fill the cans.

The following examples are provided to further describe the invention. In the following examples, one of the following cleaning procedures is used.

Cleaning Procedure A—(Low Clean).

Stage 1: Acid rinse ($H_2SO_4$ to pH of 3.0), temperature= 108° F.

Stage 2: Acid cleaner—Man-Gill PCL-452[1], 12 ml./L, mV=–8.1, temperature=128° F., ACC 45 SS[1] (0.2 ml./L), Free Acid Value (F.A.)=9.2.

Stage 3: Acid rinse ($H_2SO_4$ to pH of 3.1), temperature= 95° F.

Stage 4: Tap water rinse-ambient temperature or Man-Gill DR-1479[1] conversion coating to pH of 2.88, as indicated in the examples.

Stage 5: Tap water rinse-ambient temperature.

Stage 6: Deionized water; low VOC treatment: $H_2SO_4$ to pH of 5.0; 500 ppm polyethylene mixture[2]; and/or 1000 ppm DR-1597[1] as indicated in the examples. Oven dry at 390° F.

[1] A6ailable from Man-Gill Chemical Company.
[2] Experimental Emulsion 24925 from Michelman, Inc., Cincinnati, Ohio containing 24.5 to 25.5 solids which are reported to be based on A-C® 316.

Cleaning Procedure (B)—(High Clean)

Stage 1: Acid rinse ($H_2SO_4$ to pH of 2.9); temperature of 104° F.

Stage 2: Acid cleaner Man-Gill PCL-452 (15 mls/L)mV= –3.2); temperature of 138° F.; Acc 45SS (0.3 mls/L), F.A.=11.5.

Stage 3: Acid rinse ($H_2SO_4$ to pH of 2.61); temperature of 100° F.

Stage 4: Man-Gill DR-1479 conversion coating at pH of 2.88; or tap water rinse at ambient temperature as indicated in the examples Stage 5: Tap water rinse at ambient temperature Stage 6: Deionized water; low VOC treatment: sulfuric acid to pH of 3.6; 500 ppm of Michelman ME 24925 polyethylene emulsion when indicated in the examples. Oven dry at 390° F.

In the Examples wherein a lacquer is applied, the lacquer is applied on a pilot line lacquer sprayer. The operating parameters of the pilot lacquer spray equipment are as follows: Nordson nozzle 016034; burst, 80 milliseconds; pressure, 750 psig; and coating weight, 99 to 100 mg. The coated cans are then examined for metal exposures.

Metal Exposure Testing.

The metal exposure rating is determined using an enamel rater which is used to determine the amount of metal exposure after the metal has been coated with a siccative coating such as a lacquer, enamel, varnish, etc. The procedure for this test is to add electrolyte solution inside a coated can, and thereafter apply a current to the metal which is measured in milliamperes using an electrode to determine if any metal exposures are present. The results are rated based on the current measured. The lower the current, the lower the metal exposures. The treated cans are tested for metal exposures using a Sencor SI 9000 Enamel Rater. The results of the studies are tabulated and statistically processed using the following method of analysis: the mean plot—plots the mean for each factor and the 95% confidence level for the mean. A graph of the results is prepared for each example (see FIGS. 1–9). In the graph, the * is the mean for the data collected in that data set. The I-bar in the graph represents the variance in the data with a 95% confidence level. For two or more groups to be statistically and significantly different, the I-bars should not overlap. The standard error measurement is used to determine the confidence intervals.

$$\text{Standard Error} = \text{Standard Deviation}/\sqrt{\text{Sample Size}}$$

Mobility Testing.

Mobility refers to the ability of an aluminum container to travel smoothly through the manufacturing process. Improving the mobility allows an increase in the production and reduces the tendency for printer trips consequently reducing scrap rate. The incline plane mobility test measures the frictional forces that cause the cans to remain stationary. Mobility is related to the coefficient of static friction (C.O.S.F.) which is the tangent of the angle of incline necessary to overcome these frictional forces. Reducing the coefficient of static friction enables the cans to move more freely, thus improving their mobility. The procedure used herein for measuring the C.O.S.F. is as follows:

(1) Remove three cans from oven and allow the cans to cool for three minutes. During this time, mark one set of "looper lines" on each can.

(2) Place the cans on the incline plane with the "looper lines" pointing up. The two base cans are placed with the open side to the right. The top can is placed with the open end to the left, approximately one inch from the open end of the bottom cans.

(3) Slowly elevate the platform (incline plane) until the top can slides and strikes the horizontal surface and note the angle of incline. Rotate the top can 90 degrees and repeat the process three more times. Rotate the bottom cans 180 degrees and repeat the cycle once again.

(4) The complete procedure produces eight data points. The data is reported as the tangent of the average of the angle of incline which is expressed as the C.O.S.F.

The inventive mobility enhancer is adapted for improving the mobility of aluminum cans as they are conveyed at high speeds along conveyors. The mobility enhancer lowers the C.O.S.F. on the outside surface of the can and thereby enhances its mobility. The process is particularly suitable for enhancing the mobility of cans manufactured in a high speed production line (i.e., in excess of about 1000 cans per minute, preferably in excess of about 1400 cans per minute, more preferably in excess of about 1800 cans per minute) as the cans pass from the wash process area of the manufacturing facility to other areas for further processing (e.g., lacquering, painting, etc.).

The results of the testing in the Examples are found in FIGS. 1–9. In these figures, the symbols have the following meanings:

Polyethyle=polyethylene

Convct. Or convcoat=conversion coating

Convctpoly=conversion coating & polyethylene

EOPO=Man-Gill DR-1597

Convet EOPO=conversion coating & EOPO

Example I

Twelve aluminum cans are cleaned as outlined in cleaning procedure B wherein Stage 4 is a water rinse stage (i.e., no conversion coating), and Stage 6 contains polyethylene, oven dried at 390° F. and then sprayed with ICI (Glidden) 640-C-1482 lacquer having a VOC of 2.5 lbs/gal.

Figure 1:
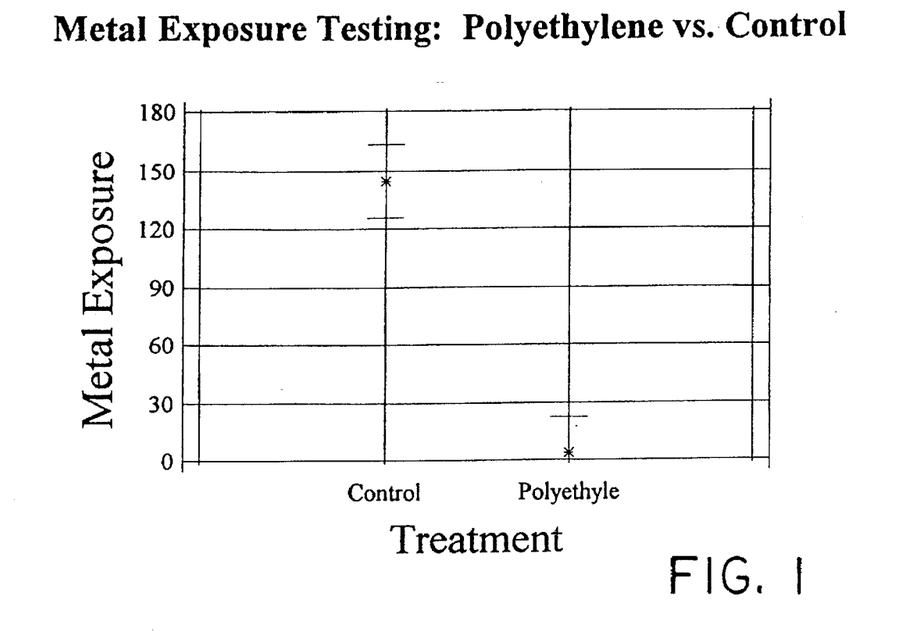
FIG. 1 is a graph of the results of the metal exposure testing on the cans of Example I.

FIG. 1 is a mean plot of the results of the rating of the cans of Example I. For comparison, aluminum cans are also sprayed in the same manner as in this example except that Stage 6 does not contain any polyethylene or DR-1597. The results on the aluminum cans (Control) also are contained in the graph of FIG. 1. As can be seen from the results, there is a significant reduction in the metal exposure when Stage 6 contains polyethylene.

Example II

Three sets of aluminum cans are cleaned as outlined in the cleaning procedure B as follows:

Set No. 1 (Convct): Conversion coating applied in Stage 4, DI water only in Stage 6.

Set No. 2 (Polyethyle): Tap water rinse in Stage 4, polyethylene included in Stage 6 with no DR-1597.

Set No. 3 (Convctpoly): Conversion coating included in Stage 4 and a polyethylene included in Stage 6 with no DR-1597.

Figure 2:
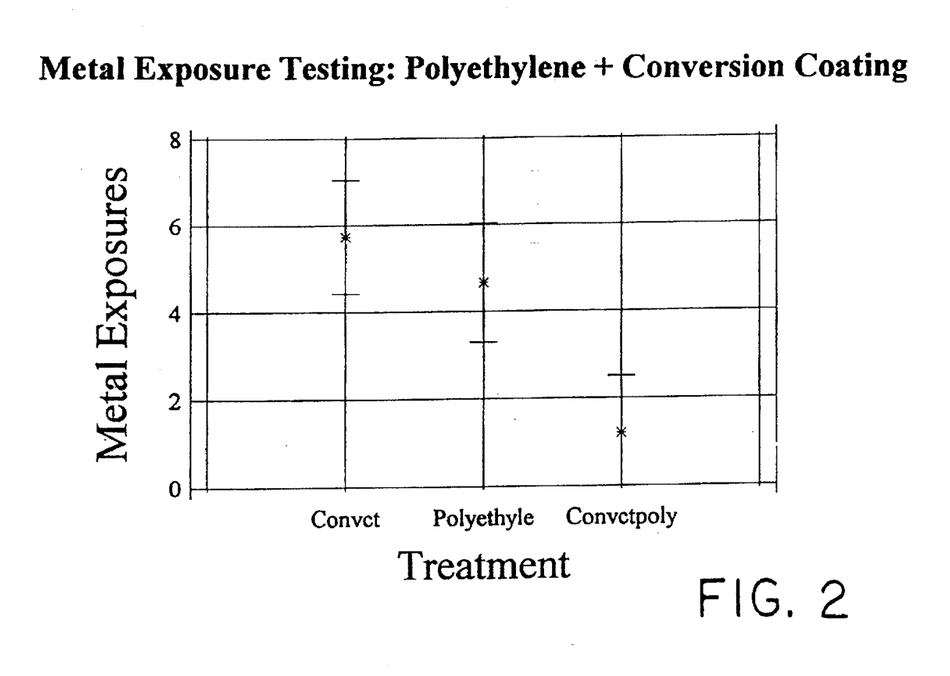
FIG. 2 is a graph of the results of the metal exposure testing on the cans of Example II.
Figure 3:
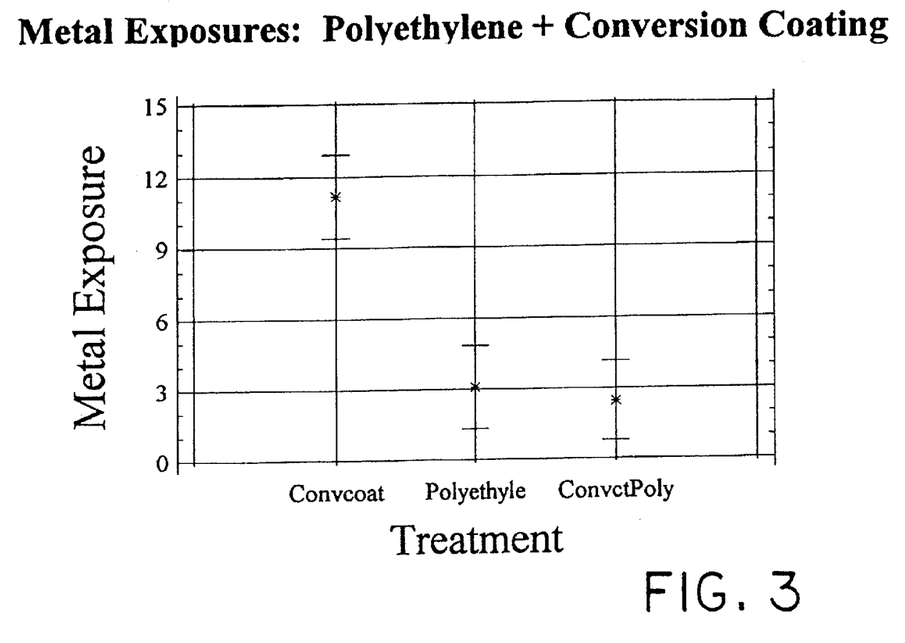
FIG. 3 is a graph of the results of the metal exposure testing on the cans of Example III.
Figure 4:
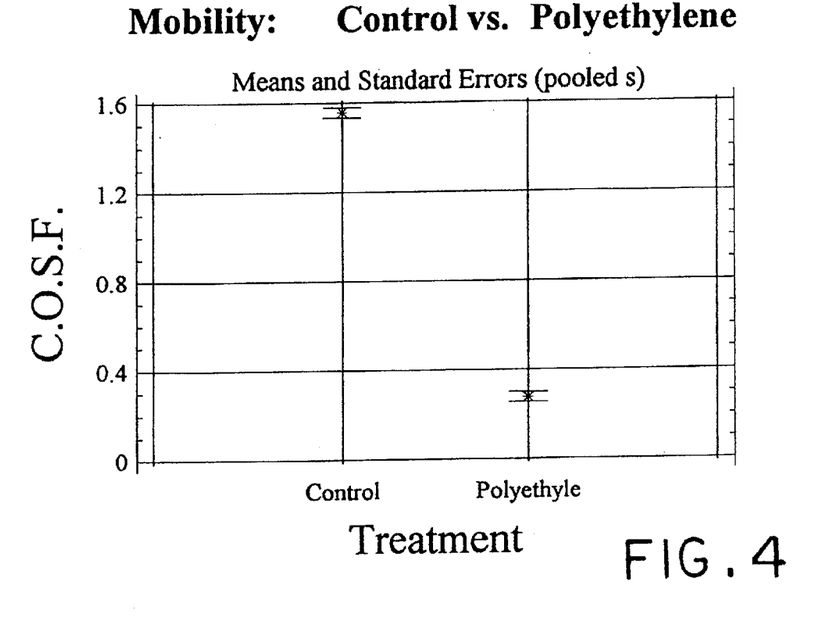
FIG. 4 is a graph of the results of the mobility testing in the cans of Example IV.
Figure 5:
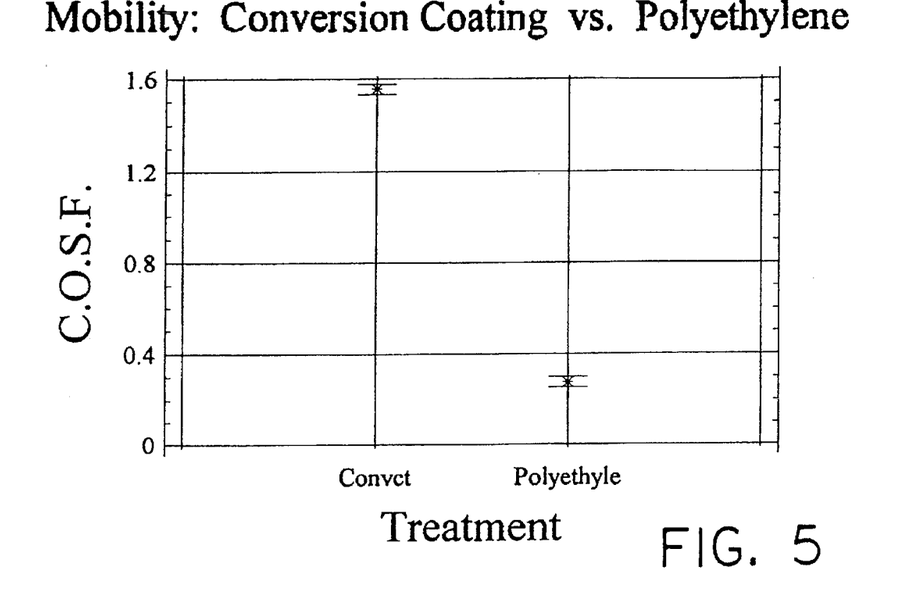
FIG. 5 is a graph of the results of the mobility testing in the cans of Example V.
Figure 6:
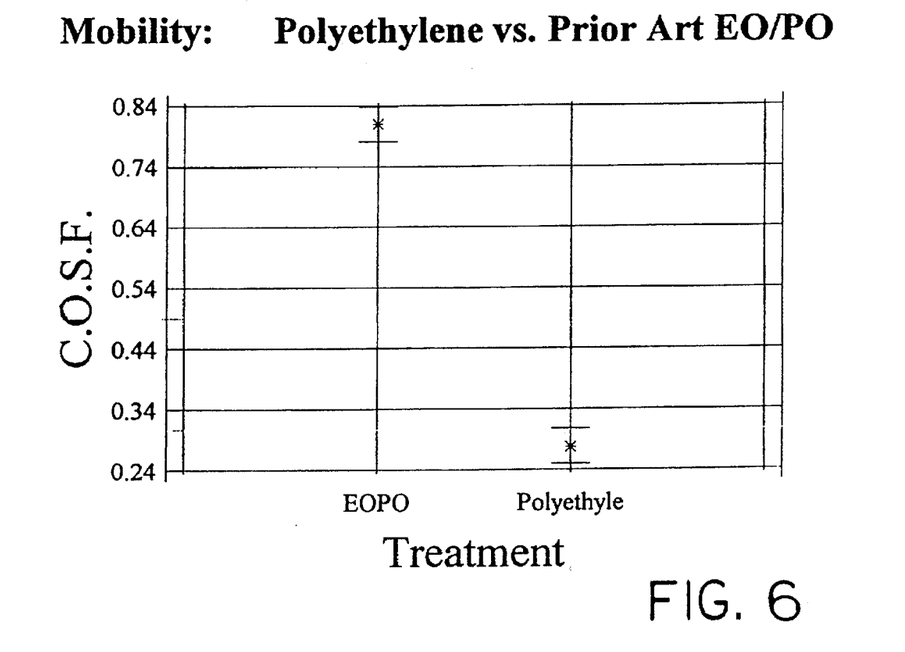
FIG. 6 is a graph of the results of the mobility testing in the cans of Example VI.

The three sets of cleaned and dried cans are then sprayed with ICI 640-C-552 lacquer having a VOC of 3.6 lbs/gal. The results of the metal exposure testing on the three sets of aluminum cans are shown in FIG. 2. The combination of conversion coating and polyethylene treatments provides a significant reduction and metal exposures which is superior to the individual components.

Example III

Three sets of aluminum cans are cleaned as outlined in cleaning procedure B as follows:

Set No. 1 (Convcoat): Stage 4 contains conversion coating and Stage 6 contains DI water only.

Set No. 2 (Polyethyle): Stage 4 contains tap water and Stage 6 contains DI water and the polyethylene.

Set No. 3 (Convctpoly): Stage 4 contains conversion coating and Stage 6 contains DI water and the polyethylene.

After cleaning, the aluminum cans are oven-dried and then lacquered with ICI 640-C-1482 (VOC=2.5). The results of the metal exposure rating are found in FIG. 3. The polyethylene provides improvements in reducing the metal exposures when compared to the conversion coating, and the metal exposures of the conversion-coated cans are reduced significantly with the addition of the polyethylene treatment.

Example IV

Two sets of aluminum cans are cleaned as outlined in cleaning procedure B as follows:

Set No. 1 (Control): Stage 4 contains tap water rinse (no DR-1479), and Stage 6 contains DI water (no polyethylene or DR-1597).

Set No. 2 (Polyethyle): Stage 4 contains tap water (no DR-1479), and Stage 6 contains DI water and a polyethylene (no DR-1597).

After cleaning, the aluminum cans are oven-dried at 390° F. No lacquer is applied to the cans which are to be tested for mobility enhancement. The results of the mobility testing are summarized in FIG. 4. The polyethylene treatment improves the mobility by significantly lowering the C.O.S.F. of the cans.

Example V

Two sets of aluminum cans are cleaned as outlined in cleaning procedure B as follows:

Set No. 1 (Convct): Stage 4 contains conversion coating, and Stage 6 contains DI water (no polyethylene or DR-1597).

Set No. 2 (Polyethyle): Stage 4 contains tap water (no conversion coating), and Stage 6 contains DI water and polyethylene (no DR-1597).

After cleaning, the cans are oven-dried at 390° F. The mobility properties of the cans are measured as outlined in the incline plane mobility testing procedure, and the results are summarized in FIG. 5. The polyethylene provides a significant improvement in mobility when compared to the mobility contained with the conversion coating.

Example VI

Two sets of aluminum cans are cleaned as outlined in cleaning procedure B as follows:

Set No. 1 (EOPO): Stage 4 contains tap water, and Stage 6 contains DI water, and DR-1597 (no polyethylene).

Set No. 2 (Polyethyle): Stage 4 contains tap water, and Stage 6 contains DI water, and polyethylene (no DR-1597).

The cans are dried at 285° F. After drying, the mobility properties of the cans are measured as outlined in the incline plane mobility testing procedure, and the results of this testing are summarized in FIG. 6. The polyethylene provides significant improvements in mobility performance compared to the DR-1597.

Example VII

Three sets of aluminum cans are cleaned as outlined in cleaning procedure A as follows:

Set No. 1 (Control): Stage 4 contains tap water (no conversion coating), and Stage 6 contains DI water (no polyethylene or DR-1597).

Set No. 2 (ConvctEOPO): Stage 4 contains conversion coating, and Stage 6 contains DI water and DR-1597 (no polyethylene).

Set No. 3 (Convctpoly): Stage 4 contains conversion coating, and Stage 6 contains DI water and polyethylene (no DR-1597).

Figure 7:
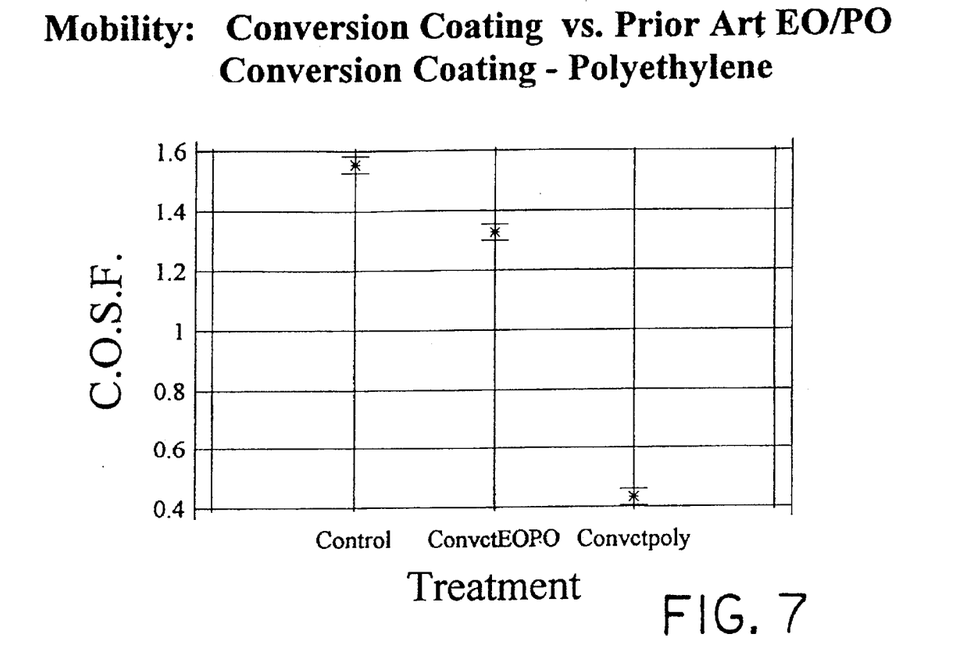
FIG. 7 is a graph of the results of the mobility testing in the cans of Example VII.

After drying at 390° F., the mobility of the aluminum cans is measured as outlined in incline plane mobility testing procedure, and the results are shown in FIG. 7. The addition of DR-1597 after the conversion coating provides a significant improvement in mobility. The addition of the polyethylene treatment after a conversion coating provides an even more significant improvement in mobility by dramatically lowering the C.O.S.F.

Drying Temperature Reduction Testing.

In one embodiment, the process of the present invention results in a reduction in an oven temperature required to dry the aluminum cans after they have been washed. In this test, the washed aluminum cans are dried at decreasing temperatures, and the temperature at which some wet cans are obtained, and the number of wet cans obtained at each temperature are recorded.

Example VIII

Temperatures of 390° F., 380° F. and 285° F. are utilized in the test on aluminum cans treated as outlined in cleaning procedure A. In one set of aluminum cans (Control), no conversion coating or polyethylene or DR-1597 is included in the procedure. A second set of cans is treated with the same cleaning process except that polyethylene is included in Stage 6; and a third set of aluminum cans is cleaned by the same process except that polyethylene and DR-1597 are included in Stage 6. The number of wet cans exiting the oven at each temperature after a residence time of about 90 seconds is recorded. The results are summarized in the following Table.

| Oven Temperature Reduction Results | | | |
|---|---|---|---|
| | Percent Wet Cans | | |
| Oven Temp. °F. | Control | Polyethylene | Polyethylene + DR-1597 |
| 390 | 0 | 0 | 0 |
| 380 | 12.5 | 12.5 | 0 |
| 285 | 100 | 100 | 0 |

The results in the above table indicate the improvement in oven temperature reduction when the mixture of polyethylene and DR-1597 is included in Stage 6 of the cleaning process. The process of the present invention provides the ability to operate over a wider and lower temperature range and, therefore, at a greater conveyor speed.

Example IX

In this example, the lacquer performance is compared for different cleaning levels. Four sets of aluminum cans are cleaned as follows:

Set No. 1 (Control A): These cans are cleaned as outlined in Cleaning Procedure A with no conversion coating, polyethylene or DR-1597 treatment.

Set No. 2 (Poly A): These cans are cleaned as outlined in Cleaning Procedure A, and the polyethylene is included in Stage 6. There is no conversion coating in Stage 4 or DR-1597 in Stage 6.

Set No. 3 (Control B): These cans are cleaned as outlined in Cleaning Procedure B without conversion coating, polyethylene or DR-1597.

Set No. 4 (Poly B): These aluminum cans are cleaned as outlined in Cleaning Procedure B with polyethylene but without conversion coating and DR-1597.

After drying the cleaned cans, ICI 640-C-552 lacquer (VOC=3.6) is applied to the cleaned cans. The results of the metal exposure rating of these cans are summarized in FIG. 8.

Figure 8:
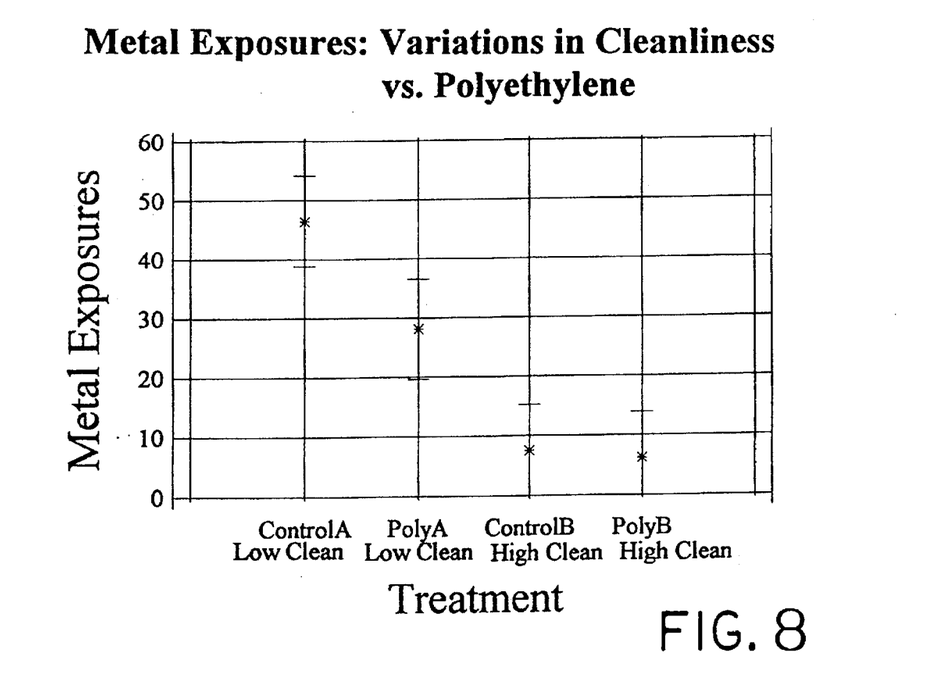
FIG. 8 is a graph of the results of the metal exposure testing on the cans of Example IX.
Figure 9:
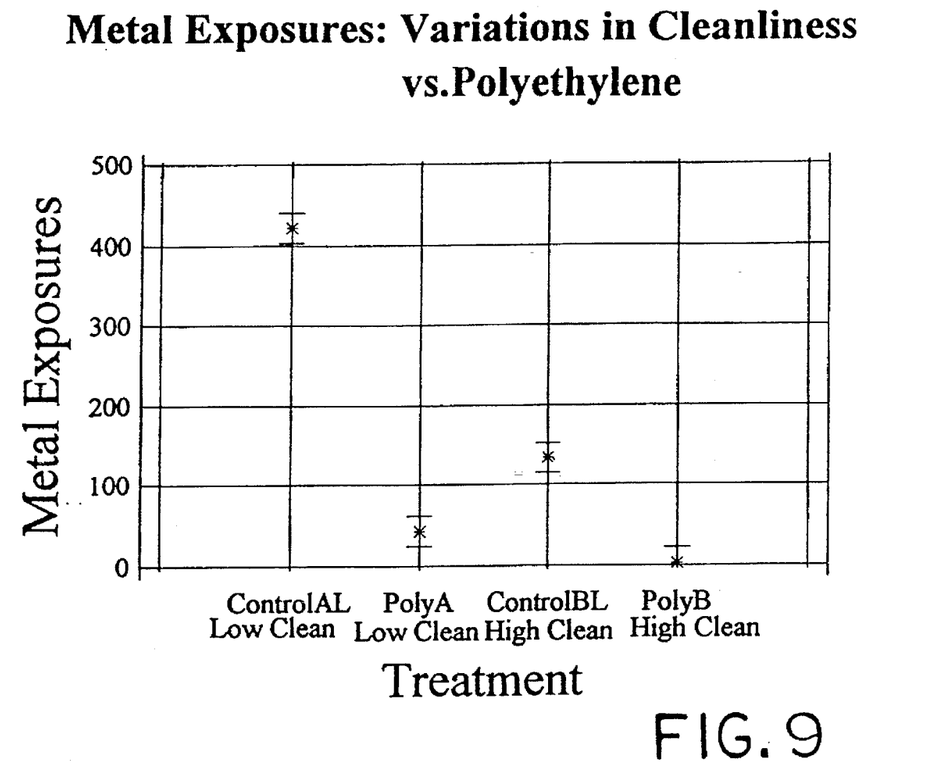
FIG. 9 is a graph of the results of the metal exposure testing on the cans of Example X.

As can be seen from the results, when this high VOC lacquer is utilized, there is a significant reduction in metal exposures at the low cleaning level (Control A) while at the high cleaning level, there is no significant difference with this lacquer between the control and the polyethylene treated cans.

Example X

This example compares different cleaning levels with the low VOC lacquer. Four sets of aluminum cans are cleaned as follows:

Set No. 1 (Control AL): These cans are cleaned as outlined in Cleaning Procedure A without the conversion coating, polyethylene or DR-1597. This process represents a reduced cleaning level with no additional treatments.

Set No. 2 (Poly A): These cans are cleaned as outlined in Cleaning Procedure A with the polyethylene in Stage 6 but without a conversion coating or DR-1597.

Set No. 3 (Control BL): These cans are cleaned as outlined in Cleaning Procedure B without conversion coating, polyethylene or DR-1597.

Set No. 4 (Poly B): These cans are cleaned as outlined in Cleaning Procedure B with polyethylene added in Stage 6 but without conversion coating or DR-1597.

Low VOC lacquer (ICI 640-C-1482) is applied to the aluminum cans after drying and the cans are rated for metal exposures by the procedure described above. The results of the metal exposure rating tests are summarized in FIG. 9. As can be seen from those results, with a low VOC lacquer, the polyethylene significantly improves the metal exposures for both levels of cleaning. There is a dramatic significant difference in the lack of performance and the low cleaning level between Control AL and the polyethylene treatment (Poly A). It is important to note that the polyethylene treated cans at the low cleaning level (Poly A) produce significantly reduced metal exposures when compared to the high cleaning level control (Control BL). It is surprising and unexpected that the polyethylene treatment provides such a significant reduction in metal exposures with these lubricant contaminated metal surfaces (Control AL).

Example XI

In this example, two sets of aluminum cans are cleaned as outlined in cleaning procedure A, and the cans are dried at 390° F. In one set of aluminum cans, DR-1597 is included in Stage 6 (no conversion coating or polyethylene). In the process used to clean the second set of cans, polyethylene is included in Stage 6 (no conversion coating or DR-1597). After drying at 390° F., the mobility of the aluminum cans is measured as outlined in the incline plane mobility testing procedure, and the results are summarized in the following table.

| Mobility Performance | |
|---|---|
| Treatment | Mobility, C.O.S.F.* |
| Control | 1.42 |
| DR-1597 | 1.22 |
| Polyethylene | 0.27 |

*Average of 8 data points.

The above results demonstrate the improved mobility obtained when polyethylene is included in Stage 6 compared to the improvement contained at this temperature when DR-1597 is included in Stage 6. It is believed that at 390° F., the components of DR-1597 are vaporized in the oven and are not retained on the surface of the aluminum cans to improve mobility. Thus, the aqueous mixtures of the present invention comprising polyethylene provides the ability to operate over a wider temperature range than the prior art DR-1597.

The process of the present invention is applicable to all types of metal surfaces, and in particular, to cans made of pure aluminum, or alloys of aluminum which may contain minor amounts of metals such as magnesium, manganese, copper and silicon. These include three common alloys used in the container industry which are identified as aluminum alloys 3003, 3004 and 5182.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A process for improving the mobility of formed metal surfaces and reducing the metal exposure rating of the surfaces which subsequently are coated with a siccative coating comprising the steps of (A) cleaning the formed metal surface with an aqueous acidic or alkaline cleaning solution; and (B) drying the cleaned formed metal surface, wherein at least one interior and exterior surface of said formed metal surface, prior to the drying step (B), is contacted with an aqueous mixture comprising an oxidized ethylene homopolymer, having a weight average molecular weight of from about 1000 to about 10,000, and an acid number of from about 5 to about 55 to form a film on the surface.

2. The process of claim 1 wherein the oxidized ethylene homopolymer is treated with from about 1 to about 50 moles of ethylene oxide, propylene oxide, or mixtures thereof.

3. The process of claim 2 wherein the oxidized ethylene homopolymer is an oxidized high-density polyethylene.

4. The process of claim 2 wherein the oxidized ethylene homopolymer is an oxidized low-density polyethylene.

5. The process of claim 2 wherein the oxidized ethylene homopolymer is characterized as having an acid number of from about 10 to about 40 weight.

6. The process of claim 2 wherein the formed metal surface is the surface of an aluminum or aluminum alloy can.

7. A process for reducing the coefficient of static friction and reducing the metal exposure rating of aluminum and aluminum alloy cans which subsequently are coated with a siccative coating which comprises the steps of:

(A) cleaning the aluminum cans with one or more aqueous acidic or alkaline cleaning solutions and one or more water rinses;

(B) drying the cleaned aluminum cans;

(C) conveying the cleaned and dried cans on automatic conveying equipment to a location; and (D) subsequently applying a siccative coating composition to the cleaned cans wherein the improvement comprises contacting at least one of the interior and exterior surfaces of said aluminum cans, prior to the drying step (B), with a metal exposure reducing composition comprising water and an oxidized ethylene homopolymer having a weight average molecular weight of from about 1,000 to about 10,000 and an acid number of from about 5 to about 55 that forms a film on the surface of the cans to provide the surface of the cans, after application of the siccative coating composition, with a metal exposure rating that is less than would be obtained on the can surfaces of the same type without the film of metal exposure reducing composition.

8. The process of claim 7 wherein the oxidized ethylene homopolymer has been reacted with from about 1 to about 50 moles of ethylene oxide, propylene oxide, or mixtures thereof.

9. The process of claim 7 wherein the oxidized ethylene homopolymer is an oxidized low density polyethylene.

10. The process of claim 7 wherein the oxidized ethylene homopolymer is a low-density oxidized polyethylene.

11. The process of claim 7 wherein the oxidized ethylene homopolymer is characterized as having an acid number of from about 10 to about 40 and a weight average molecular weight of from about 1 to about 10,000.

12. The process of claim 7 wherein the aqueous mixture also comprises at least one nonionic polyoxyalkylene glycol comprising poly(oxypropylene)hydrophobic groups and poly(oxyethylene)hydrophilic groups, or an alkoxy derivative thereof, or a mixture of at least one of said nonionic polyoxyalkylene glycol and at least one alkoxy derivative thereof.

13. The process of claim 7 wherein the aqueous mixture is included in one of the cleaning solutions or one of the water rinses of step (A).

14. The process of claim 1 wherein the aqueous mixture is included in a final water rinse.

15. The process of claim 7 wherein a corrosion-resistant conversion coating is applied to the aluminum cans before the cans are contacted with the aqueous mixture comprising water and an oxidized ethylene homopolymer.

16. The process of claim 7 wherein the conversion coating is applied by contacting the cans with an aqueous acidic composition having a pH of less than 5 and comprising in dissolved form, hafnium, and/or zirconium, fluoride and vegetable tannin.

17. The process of claim 7 wherein the siccative coating composition applied in step (D) has a VOC of less than about 3.5 lb./gal.

* * * * *